(12) United States Patent
Mehnert et al.

(10) Patent No.: US 7,598,733 B2
(45) Date of Patent: Oct. 6, 2009

(54) POSITION DETECTOR

(76) Inventors: Walter Mehnert, Grillparzerstr. 6, 85521 Ottobrunn (DE); Thomas Theil, Waldstr. 9, 85258 Weichs (DE)

( * ) Notice: Subject to any disclaimer, the term of this patent is extended or adjusted under 35 U.S.C. 154(b) by 329 days.

(21) Appl. No.: 10/534,396

(22) PCT Filed: Nov. 19, 2003

(86) PCT No.: PCT/EP03/12938

§ 371 (c)(1), (2), (4) Date: Dec. 3, 2005

(87) PCT Pub. No.: WO2004/046735

PCT Pub. Date: Jun. 3, 2004

(65) Prior Publication Data
US 2006/0164077 A1   Jul. 27, 2006

(30) Foreign Application Priority Data

Nov. 20, 2002  (DE) ................................. 102 54 231
Dec. 17, 2002  (DE) ................................. 102 59 223

(51) Int. Cl.
*G01B 7/30* (2006.01)
*G01B 7/14* (2006.01)
*H01F 5/00* (2006.01)
*H01L 43/06* (2006.01)

(52) U.S. Cl. ............................. 324/207.15; 324/207.2; 324/207.25; 324/207.24

(58) Field of Classification Search ............ 324/207.15, 324/207.16, 207.24, 207.25, 207.2, 173, 324/174, 165

See application file for complete search history.

(56) References Cited

U.S. PATENT DOCUMENTS

| 4,364,013 | A   | 12/1982 | Caster et al. |
| 5,714,882 | A * | 2/1998 | Mehnert et al. ........ 324/207.15 |
| 6,084,400 | A * | 7/2000 | Steinich et al. ........ 324/207.13 |
| 6,265,867 | B1* | 7/2001 | Fowler ................. 324/207.25 |
| 7,113,063 | B2* | 9/2006 | Romanik et al. ............ 335/205 |

FOREIGN PATENT DOCUMENTS

| DE | 28 17 169  C2 | 10/1979 |
| DE | 3317502 A1 * | 11/1984 |
| DE | 31 18 768     | 4/1992 |
| DE | 41 07 847 C1  | 9/1992 |
| EP | 0 484 716 A1  | 5/1992 |
| EP | 0 658 745 B1  | 6/1995 |
| EP | 0 724 712 B1  | 8/1996 |
| EP | 03/12938      | 10/2004 |
| JP | 02 074817     | 3/1990 |
| WO | WO 99/54685   | 10/1999 |

* cited by examiner

Primary Examiner—Kenneth J Whittington
(74) Attorney, Agent, or Firm—Woodling, Krost and Rust (57) ABSTRACT

A detector for detecting movements which, in its simplest form of embodiment, has one exciter magnet: (EM) and only one individual pulse wire (FE) with one induction coil (SP1) and with a sensor (SP2, HS) for determining polarity and position of the moveable exciter magnet (EM). All information is simultaneously determined at the time ($T_s$), that the ferromagnetic element (FE) is triggered and remagnetized by said magnet (EM). For counting operation a further information about the last established position and polarity of the exciter magnet is used, which is stored in a nonvolatile memory (36) of an associated evaluation circuit.

25 Claims, 8 Drawing Sheets

POSITION DETECTOR

The invention pertains to a position detector for detecting translational and/or rotational movements by the use of a ferromagnetic element.

Ferromagnetic elements of this type are known in the form of so-called pulse wire movement detectors from U.S. Pat. No. 4,364,013 and in the form of Wiegand sensors from DE 4,107,847 C1 and DE 2,817,169 C2. In these cases, for example, a pulse wire of ferromagnetic material is surrounded by a sensor coil. The magnetic areas—also called magnetic domains or "Weiss" regions—in the ferromagnetic material are initially oriented in a random manner, but under the influence of external forces, they can be oriented into a single domain. When an external magnetic field of a certain direction and intensity is applied, this domain reverses or "flips" instantaneously. As a result, a voltage pulse which can be tapped as an output signal is generated in the sensor coil.

In a known design in the form of a rotational angle sensor (see, for example, EP 0,724,712 B1), switching and resetting magnets are conducted past these pulse wires, several of which are distributed around the circumference, so that magnetic fields first of one polarity and then of the opposite polarity permeate each of the pulse wires in succession. As a result of the remagnetization of all the magnetic domains of each pulse wire, a voltage pulse of defined duration, amplitude, and polarity is generated in the sensor coil. An electronic counting circuit evaluates these voltage pulses. The resetting magnets generate fields of the opposite polarity, which return the magnetic domains of the pulse wires to their original state, so that the pulse wire in question is ready to trigger a new pulse. This mode of operation is known as "asymmetric". In symmetric mode, a pulse which can be evaluated is also generated during the resetting phase.

As explained in the previously mentioned EP 0,724,712 B1, at least two of these sensors, distributed around the circumference in the direction of movement, make it possible to determine not only each complete revolution of a rotating shaft but also, under consideration of the characteristic positional difference between the setting process and the resetting process, its direction of rotation, where the voltage pulses which are generated can be associated uniquely to the associated angular position of the rotating shaft.

Because at least two sensors must be distributed around the circumference, it is cumbersome to construct such a system, because the pulse wire sensors must necessarily be of a certain size. This means that it is impossible to realize a revolution counter of small diameter. These sensors are also relatively expensive.

It is also known that a position detector of this type comprising only a single sensor can be used to determine the revolutions of a shaft and the direction of that rotation. In this case, the sensor is designed as a Wiegand wire, which is set up at an angle to the direction of movement of a section of the shaft with a certain magnetic polarity located opposite the Wiegand wire; the wire is thus able to generate a directionally dependent pulse (compare the previously cited DE 2,817,169 C2).

The disadvantage of an arrangement such as this is that, although it is possible to recognize the direction of rotation, the predetermined polarization means that only the rotational direction predetermined by that polarization can be detected. That is, only one rotational direction can be determined.

So that both rotational directions of a shaft can be determined, at least two such sensors with their associated evaluation circuits are therefore required. In addition, an arrangement such as this suffers under certain conditions from the disadvantage of a very low energy yield, because the angle between the direction of movement and the orientation of the sensors plays a decisive role. An arrangement of this type therefore makes it difficult to work without an external source of energy.

The task of the invention is to offer a remedy for this situation.

Because the interaction of the magnetic moments of adjacent atoms with different magnetization directions is very strong in ferromagnetic materials, the moments become aligned with each other in small spatial areas, the so-called "Weiss" regions. These regions are separated from each other by transition layers known as "Bloch" walls. It has been discovered that a single permanent domain with a uniform direction of magnetization can be obtained by, for example, mechanically stretching a ferromagnetic wire. When a domain of this kind is introduced into an external magnetic field of a certain strength and direction, the domain does not reverse as a whole; instead, its elementary magnets start to reverse from a certain starting position—preferably one end of the wire—and this proceeds in domino fashion in the direction toward the external magnetic field. Although the reversal wave thus produced in the ferromagnetic element is of finite velocity, the velocity is high enough in comparison to the speed of the exciting magnet that it is possible to speak of an "instantaneous reversal" of the domain.

By exploiting the physical relationships described above for a position detector of the type in question here comprising at least one exciter magnet, the previously mentioned task is accomplished according to the invention by means of a detector with a single ferromagnetic element, at least one induction coil, and at least one additional sensor element for the determination of information concerning the polarity and the position of the exciter magnet, where the set of information available at the time of the triggering of the single ferromagnetic element is all that is needed to determine the direction of movement of the exciter magnet.

In an especially simple variant of the invention, the effect of the Bloch wall passing over the ferromagnetic element makes it possible to detect the position of the exciter magnet by determining the direction in which the remagnetization of the ferromagnetic element is triggered. This remagnetization can be initiated from either one of the two end surfaces of the element.

The triggering direction of the remagnetization may not be confused, however, with the direction of the remagnetization itself, which is described by the magnetic poles from and to which the Weiss regions have "flipped". In the present case, the remagnetization direction has the effect of giving the regions in question the same polarity as that of the triggering pole of the exciter magnet.

The amount of kinetic energy which the elementary magnets produce when they flip over in the direction of the external field in the form of a continuously rotating shaft is large enough that not only electrical energy for a signal pulse but also energy for a counting circuit and a Hall sensor can be taken from the coil assigned to the ferromagnetic element.

Once the current position and polarity of the exciter magnet EM are known, they can be put into relationship with the most recently stored position and polarity values. This provides all the information necessary to determine the direction of movement of the exciter magnet EM and the rotating shaft to which it is permanently connected.

So that the invention can be understood more clearly, it will be explained below on the basis of a revolution counter.

In the general case, which is characterized by one exciter magnet and a resolution of half a revolution, the revolution counter system is described completely by four base states of the exciter magnet, these states being combinable in various ways, in conjunction with the most recently stored data for the magnet, namely, Z1.) north pole to the right of the reference line, Z2.) north pole to the left of the reference line, Z3.) south pole to the right of the reference line, and Z4.) south pole to the left of the reference line.

When only one pulse wire and an induction coil are used according to the invention, these four states can combine with each other in various ways to form three groups of two. The group which is present in an actual case depends on the direction in which the remagnetization is triggered:

$1^{st}$ group: Both triggering directions of the remagnetization are defined; see FIGS. 1, 2, and 3.
  a.) north pole to the right or south pole to the left of the reference line L (Z1 or Z4);
  b.) north pole to the left or south pole to the right of the reference line L (Z2 or Z3).

Figure 1:
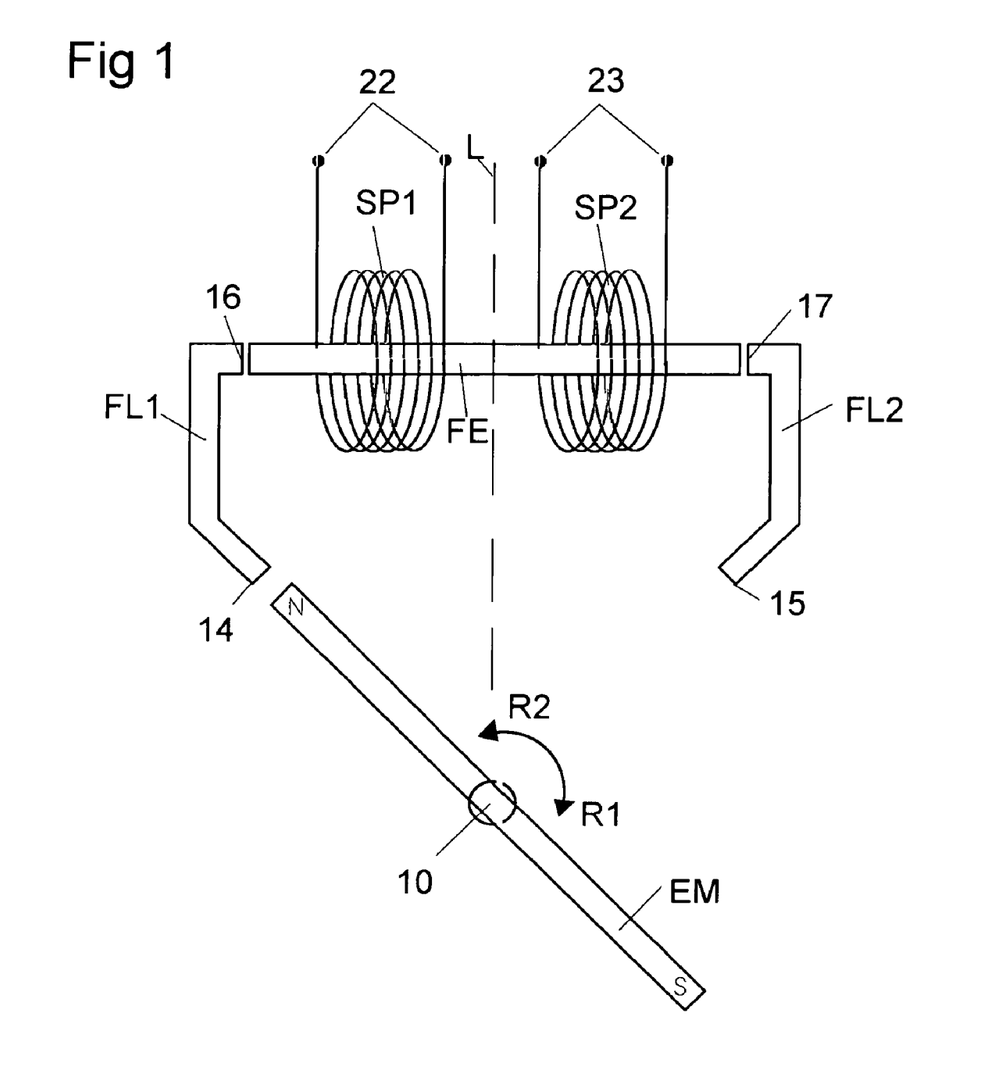
FIG. 1 shows a schematic diagram of the design of a position detector according to the invention with one ferromagnetic element, two assigned induction coils, and two ferromagnetic flux-conducting pieces.
Figure 2:
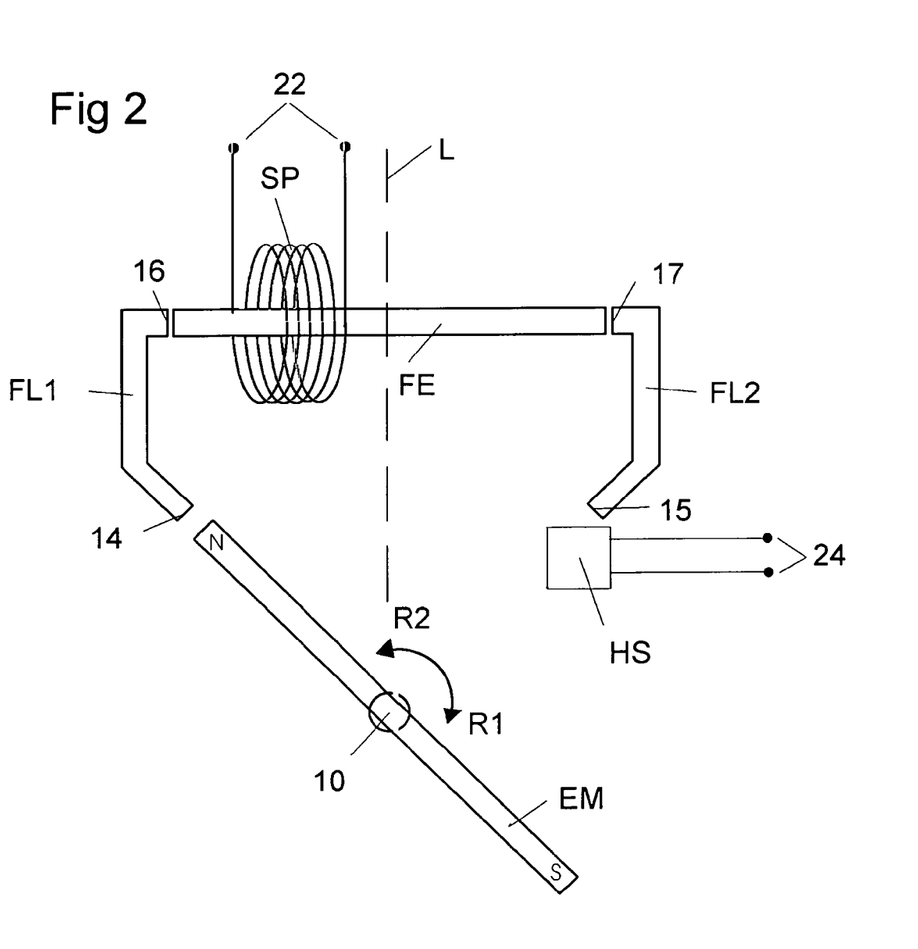
FIG. 2 shows a schematic diagram of the design of a position detector according to a second exemplary embodiment of the invention with one ferromagnetic element, one induction coil, a Hall sensor, and two ferromagnetic flux-conducting pieces.
Figure 3:
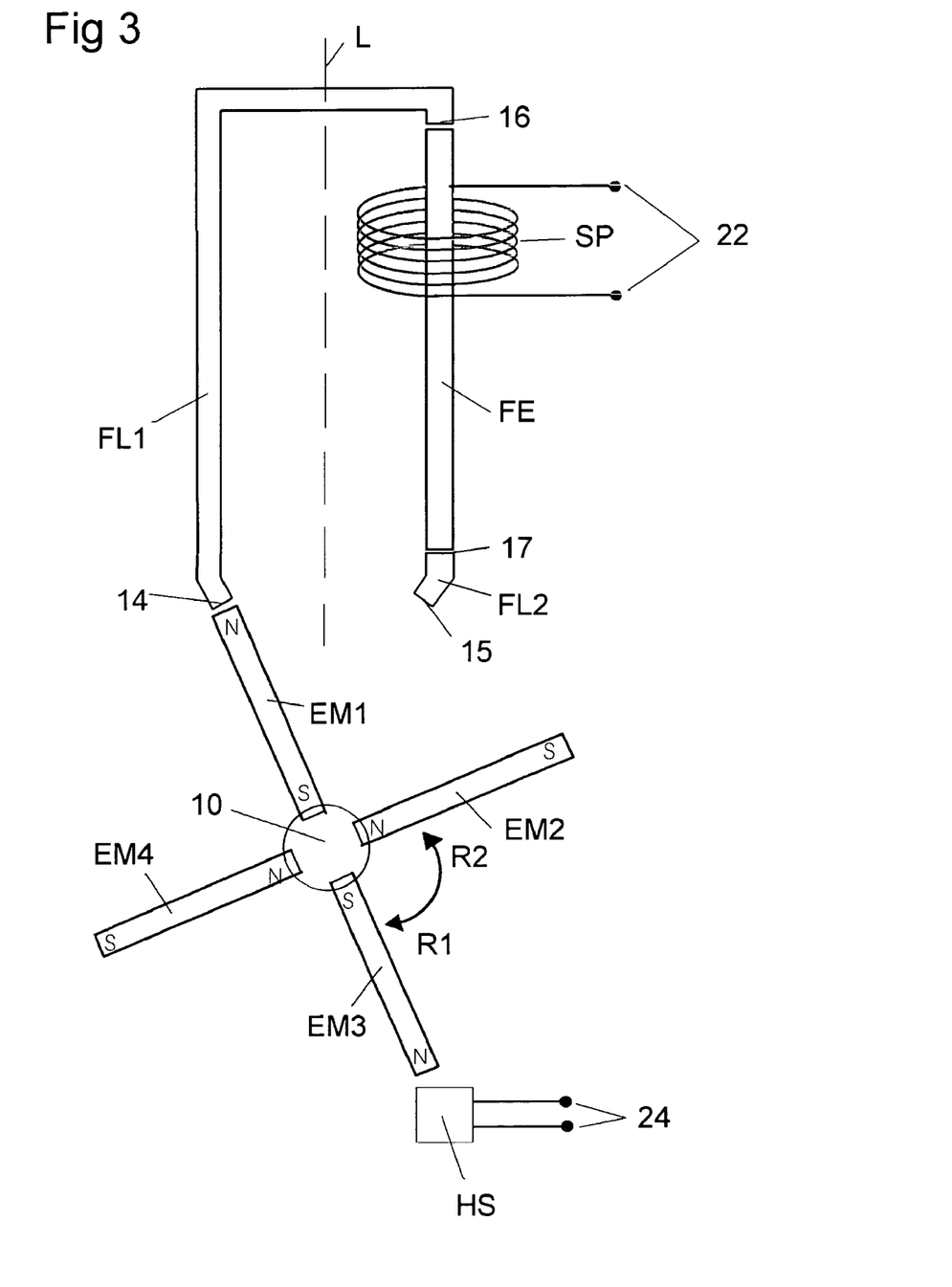
FIG. 3 shows a schematic diagram of a position detector according to a third exemplary embodiment of the invention with one ferromagnetic element, one induction coil, a Hall sensor, several exciter magnets, and two ferromagnetic flux-conducting pieces.

The position of the exciter magnet EM can be determined here by using the additional sensor element, e.g., a second induction coil or a Hall sensor, to measure the direction in which the remagnetization is triggered. This is done directly when a second coil SP2 is provided over the ferromagnetic element FE. When a Hall sensor HS is used, the measurement is made indirectly. When a Hall sensor HS is used, the polarity of the exciter magnet EM which it detects is irrelevant; the only important fact is whether it is excited or not. The polarity of the exciter magnet EM can always be found from the polarity of the voltage pulses by using the induction coil SP1 or SP of the ferromagnetic element FE to measure the remagnetization direction.

$2^{nd}$ group: Only one triggering direction of the remagnetization is defined; see FIG. 4.
  a.) north pole to the right or north pole to the left of the reference line L (Z1 or Z2);
  b.) south pole to the right or south pole to the left of the reference line L (Z3 or Z4).

Figure 4:
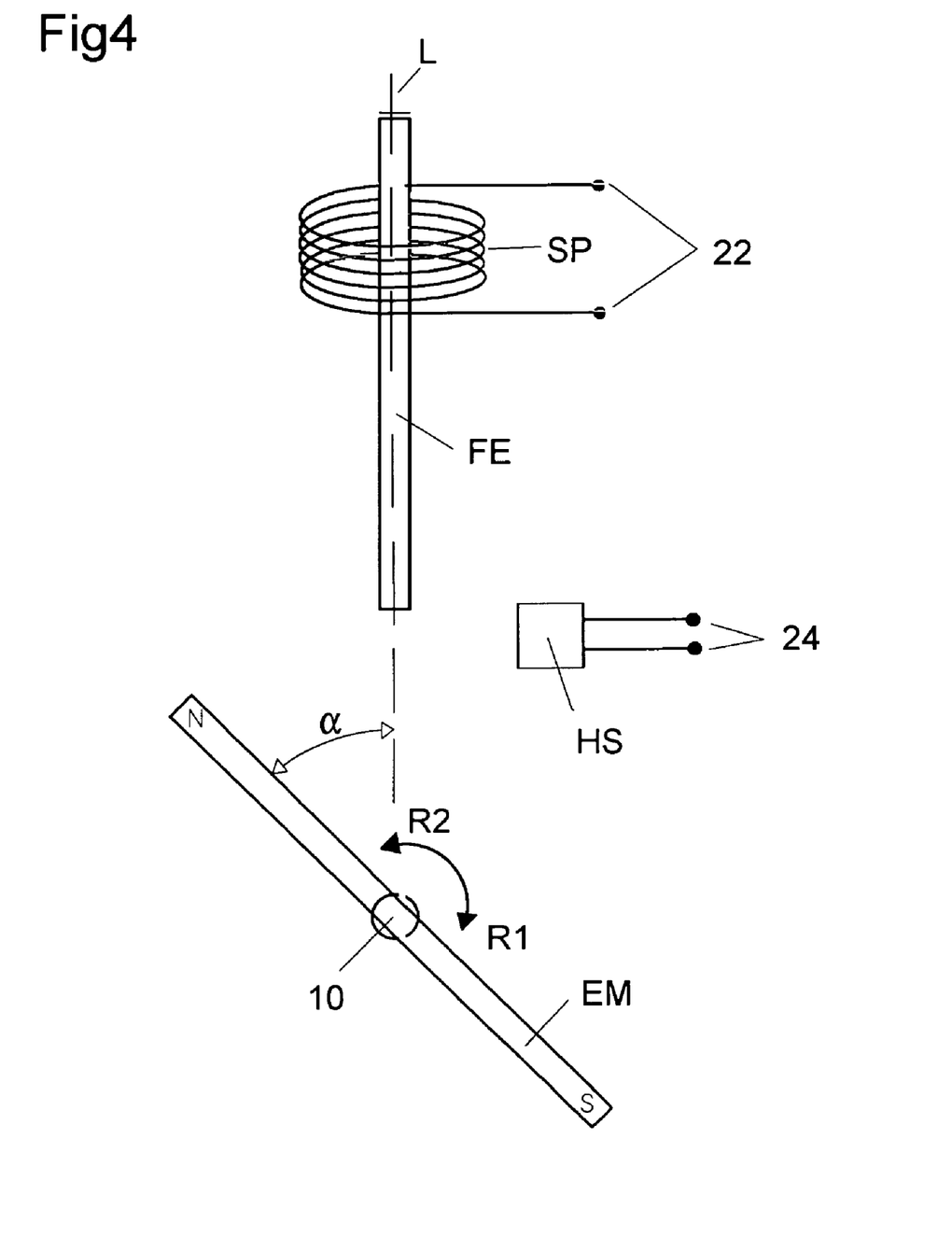
FIG. 4 shows a schematic diagram of a position detector according to a fourth exemplary embodiment of the invention with a ferromagnetic element, an induction coil, and a Hall sensor.

In this case, the position of the exciter magnet EM is always established directly by the Hall sensor, i.e., by the fact that it has been excited or not. The polarity of the exciter magnet EM can be determined independently of this by using the induction coil SP to measure the remagnetization direction.

$3^{rd}$ group: No defined remagnetization triggering direction; see FIG. 5.
  a.) north pole above and to the right of the reference line L, or south pole below and to the right of the reference line L (Z1 or Z2);
  b.) north pole below and to the right of the reference line L, or south pole above and to the right of the reference line L (Z4 or Z3).

Figure 5:
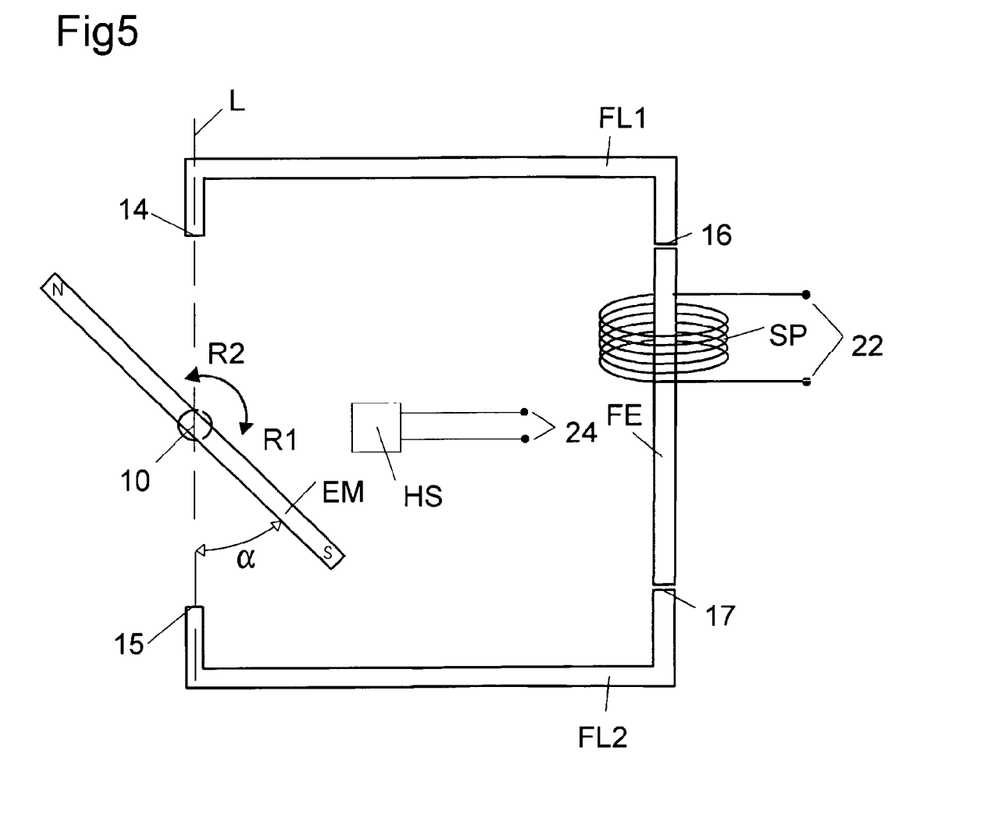
FIG. 5 shows a schematic diagram of a position detector according to a fifth exemplary embodiment of the invention with a ferromagnetic element, an induction coil, a Hall sensor, and two ferromagnetic flux-conducting pieces arranged 180° across from each other.

The corresponding polarities are evaluated as a function of the location of the Hall sensor HS, i.e., either on the right (as shown in FIG. 5) or on the left. The polarity of the exciter magnet EM is given here directly by the Hall sensor HS. The position of the exciter magnet EM (north pole or south pole above or below) is now determined indirectly by measuring the remagnetization direction.

All of the solutions are mathematically equivalent and of equal technological value.

As a result of the inventive measures described above, it is possible to realize a position detector with the simplest imaginable mechanical design comprising only a single ferromagnetic element, which works satisfactorily in both directions of movement of the exciter magnet even at speeds close to zero and even after the failure of the normal power supply. The remarkable fact here is that all of the information needed to determine the polarity and direction of movement of the exciter magnet EM is available at time $T_s$, i.e., the time at which the ferromagnetic element FE is triggered. In addition to the stored data, therefore, all of the necessary signals are present at the output terminals of the induction coils in question and/or of the Hall sensor. For this goal to be accomplished, it is necessary for the ferromagnetic element FE, the Hall sensor HS, and the exciter magnet or magnets EM to be arranged in a very specific spatial constellation with respect to each other, e.g., in one location.

A position detector with this optimally simplified design also makes it possible to take not only the energy for the output signals but also the energy for the evaluation circuit, which comprises at least a counting device, a nonvolatile memory, and a capacitor, from the sensor coil SP or the sensor coils SP1, SP2.

Additional features of the invention can be derived from the subclaims.

The invention is described below on the basis of five exemplary embodiments, which are illustrated in more-or-less schematic fashion in the drawing.

In the embodiment of a position detector shown in FIG. 1, the moving body is a shaft 10, which can rotate in the directions indicated by the arrows R1 and R2, i.e., in either a clockwise or counterclockwise direction. So that the revolutions of the shaft 10 can be counted, it is provided with an exciter magnet EM with a north pole N and south pole S. By way of the ferromagnetic flux-conducting pieces FL1 and FL2, the ferromagnetic element FE can be subjected to the influence of the magnetic field generated by the exciter magnet EM. The ends 14 and 15 of the flux-conducting pieces are situated on the circular arc described by path of the exciter magnet EM, whereas the end 16 (positioned to the left of the reference line L on the FE) and the end 17 (positioned to the right of the reference line L on the FE) face the end surfaces of the ferromagnetic element FE.

The ferromagnetic element FE, which is parallel to the direction of movement of the exciter magnet, is surrounded by two sensor coils SP1 and SP2. As the exciter magnet EM moves past the ferromagnetic element FE, it remagnetizes the element and thus generates voltage pulses of corresponding polarity. These pulses can be tapped from the output terminals 22 and 23 of the two coils. The second induction coil SP2 serves here as an additional sensor element for determining the direction in which the remagnetization is triggered. The direction in which the remagnetization is triggered and thus the position of the exciter magnet EM can be derived from the time shift between the voltage maxima of the two coils. Strictly speaking, only the coil in logical state "1" needs to be evaluated, i.e., the coil which is the first to reach its voltage maximum. The other coil has not yet reached its maximum at this point and is therefore evaluated as being in logical state "0". A pulse wire serves here as the ferromagnetic element.

In the embodiment according to FIG. 2, the elements which correspond to those of FIG. 1 carry the same reference numbers.

In contrast to FIG. 1, only one sensor coil SP is assigned to the ferromagnetic element FE. So that the position of the exciter magnet can be determined as it passes by the ferromagnetic element, a Hall sensor HS is provided here as the additional sensor element, at the output 24 of which there either is or is not a signal which can be tapped. The polarity is determined here as also in the case of FIG. 1 by the coil SP of the ferromagnetic element FE. The polarity determined by the Hall sensor is irrelevant to the evaluation, but it can be used as redundant information to monitor the behavior of the device.

The complete set of information available at time $T_s$ for determining the polarity and direction of movement of the exciter magnet therefore consists of the data in the nonvolatile memory and the signals at the output terminals of the induction coils or the signals at the output terminals of the induction coil and the output terminals of the Hall sensor.

The embodiment of the position detector according to FIG. 3 has elements corresponding to those of the previously described exemplary embodiments, except that the shaft 10 has been provided here with four exciter magnets EM1-EM4 of alternating polarity, arranged 90° apart, to increase the resolution. As the shaft 10 rotates, therefore, first a north pole and then a south pole will be pass across each of the end surfaces of the ferromagnetic element FE by way of the flux-conducting pieces FL1 and FL2. The Hall sensor required to determine the position of the exciter magnet is assigned here to the ends of the exciter magnets EM1-EM4 facing away from the ferromagnetic element.

The embodiment of the position detector according to FIG. 4 has the same elements as those of the previously described embodiments, except that no flux-conducting pieces are present here. In this variant, use is made primarily of the fact that the ferromagnetic element FE has already been triggered before the exciter magnet EM is aligned with the ferromagnetic element FE. The sensing range of the Hall sensor HS required to determine the position of the exciter magnet EM is calculated in such a way that it extends approximately up as far as the reference line L.

The embodiment of the position detector according to FIG. 5 also has elements corresponding to the previously described embodiments, except that here the ends of the flux-conducting pieces FL1 and FL2 opposite the exciter magnet are arranged 180° apart. The Hall sensor required as an additional sensor element to determine the polarity of the exciter magnet is here at a right angle to the reference line L passing through the center of rotation of the shaft 10 and is arranged in such a way that it is still sensing the corresponding poles of the exciter magnet EM when the ferromagnetic element is triggered. This always occurs at a certain angle α before the poles become aligned with the flux-conducting pieces. The position of the exciter magnet EM is determined by the coil of the ferromagnetic element FE, which measures the remagnetization direction. The present variant according to FIG. 5 can operate with a very small exciter magnet EM, especially when the intended flux-conducting pieces are also used in the form of a magnetic lens to bundle the flux.

Figure 7:
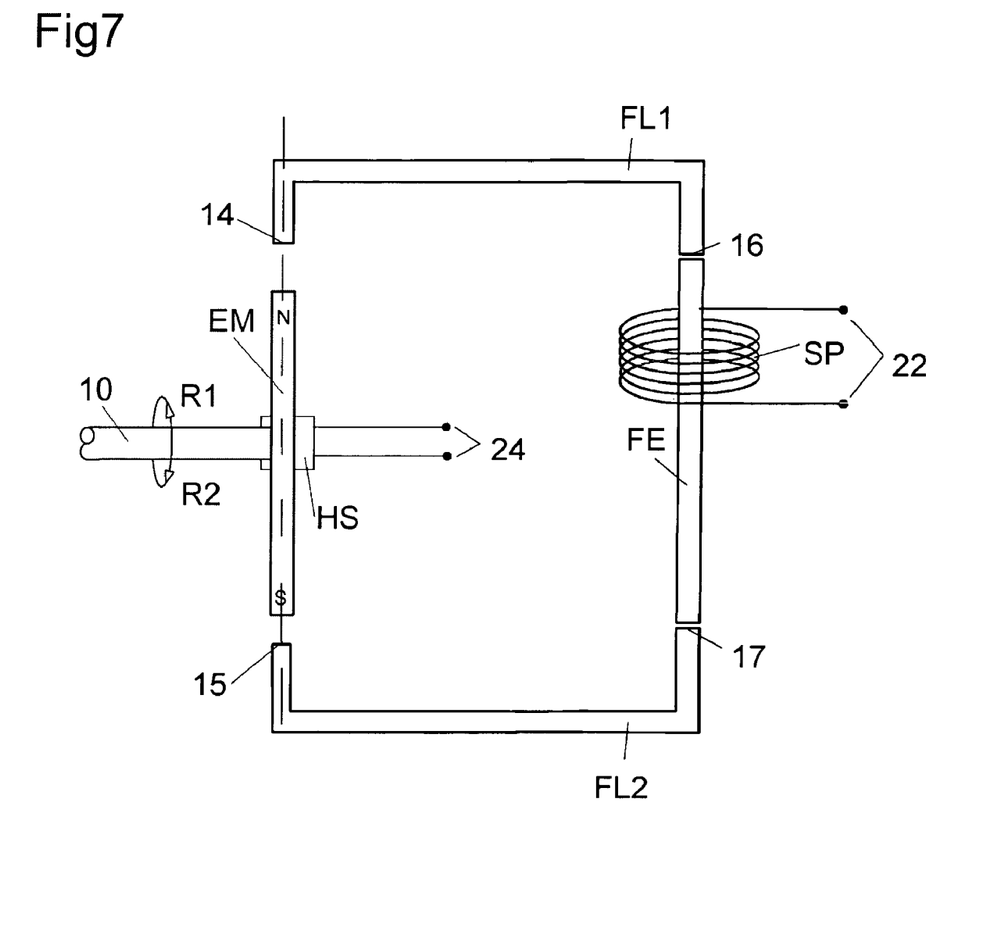
FIG. 7 shows an arrangement of a position detector corresponding to FIG. 5, in which the rotational axis of the exciter magnet has been rotated 90°, i.e., set up as shown in FIG. 4.
Figure 8:
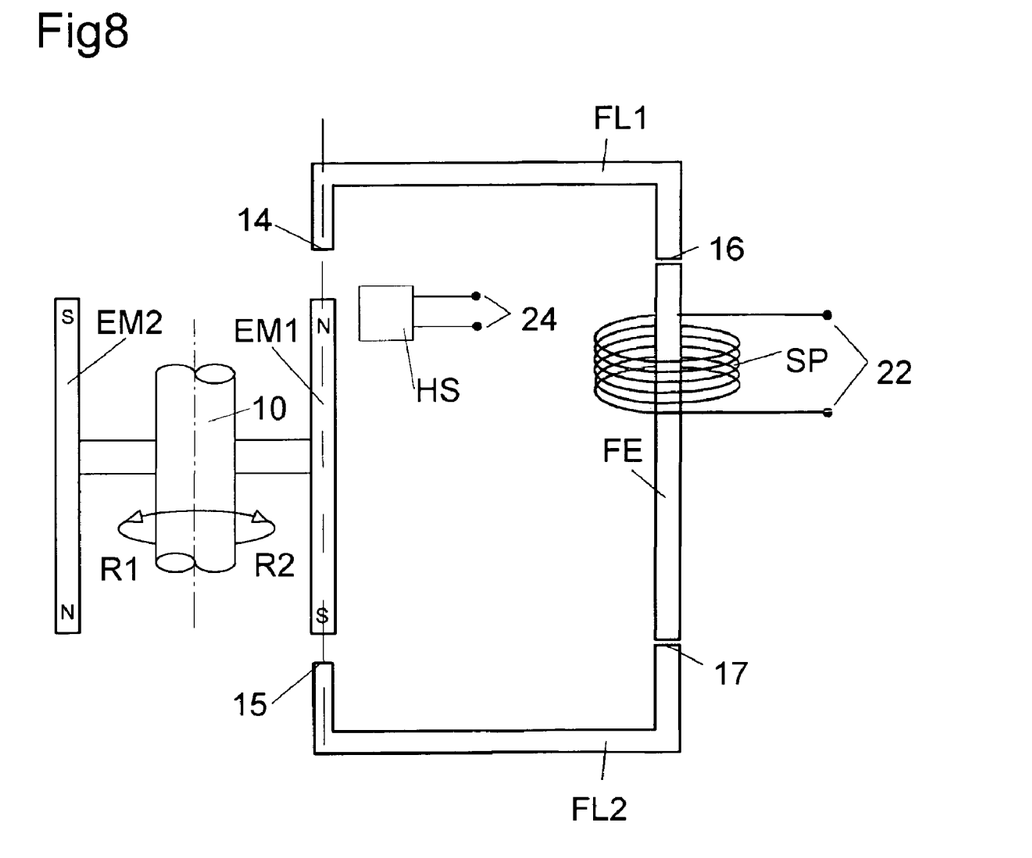
FIG. 8 shows an arrangement of a position detector corresponding to FIG. 7, in which the rotational axis of the exciter magnet has been rotated 90° versus the arrangement according to FIG. 5, where, for the sake of clarity, two exciter magnets are shown.

In the exemplary embodiments according to FIGS. 1-5, designs are shown in which the exciter magnet EM and the ferromagnetic element FE lie in the same plane relative to the rotational axis. It is also possible, of course, and even advantageous in certain cases for the ferromagnetic element FE and the exciter magnet EM to lie in different planes—as shown in FIG. 7—or in the same plane but parallel to the rotational axis—as shown in FIG. 8.

Figure 6:
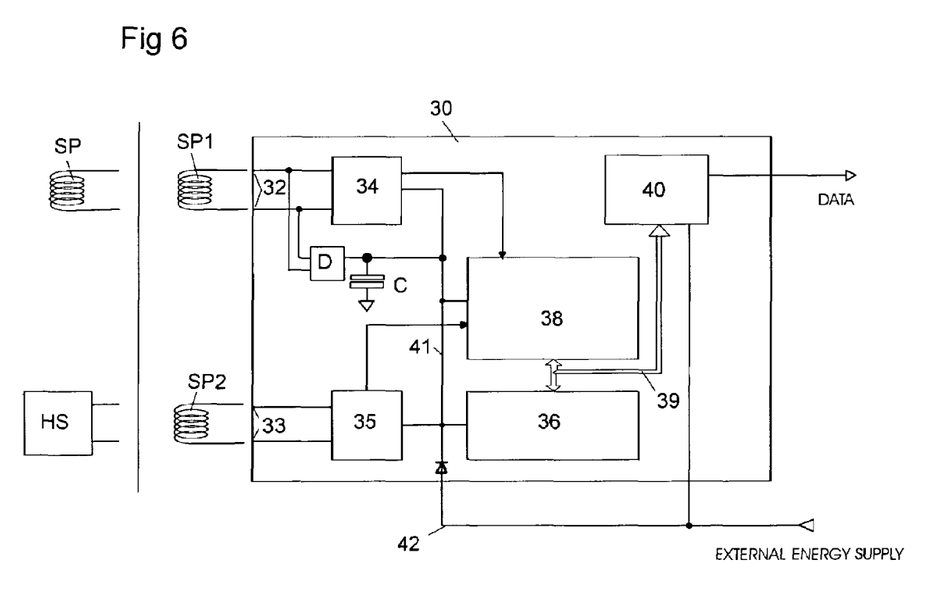
FIG. 6 shows a block circuit diagram of an evaluation circuit suitable for use in the embodiments according to FIGS. 1-5.

The input terminals 32, 33 of an evaluation circuit, designated overall by the reference number 30, are connected to the sensor coils SP1 and SP2 or to the coil SP and the Hall sensor. A circuit of this type is assigned to each of the position detectors according to FIGS. 1-5 and FIGS. 7-8. FIG. 6 shows a block circuit diagram of this evaluator. Recognition circuits 34, 35 are provided behind the input terminals. A capacitor C for supplying energy is also connected to the input 32 by way of the rectifier D. The signals from the recognition circuits 34, 35 are evaluated in a counter 38, which has its own nonvolatile memory 36. A new counter status is obtained on the basis of the history contained in the stored data and the information supplied by the recognition circuits 34, 35 concerning the current position and polarity of the exciter magnet. This new status is then stored in the nonvolatile memory unit, usually a FRAM unit.

The energy for the evaluation circuit is usually taken from the signals sent by the induction coils SP, SP1, and SP2. If only one induction coil SP is used, then the energy for the Hall sensor is also supplied by this coil.

The connecting line 41 is part of the voltage supply for the previously described evaluation circuit. The data can be read out via the taps 39 and an interface 40. A line 42—if provided—serves to bring energy in from the outside, especially when an EEPROM is used in addition to the FRAM. An EEPROM usually makes it possible for the evaluation circuit to operate at very high temperatures, at which configuration data in a FRAM would be lost after only a short time.

Common to all of the previously described exemplary embodiments is that the revolutions and/or rotational direction of the shaft 10 can be detected with precision by only a single ferromagnetic element, e.g., a pulse wire, which also makes available sufficient energy to supply both an evaluation circuit and a Hall sensor as an additional sensor element. In the simplest variant of the inventive arrangement of the pulse wire, according to which the two ends of the pulse wire are equivalent in terms of measuring technology, the generated voltage pulses contain information on both the position and the polarity of the triggering exciter magnet.

Another essential point is that all of the information concerning the triggering direction of the remagnetization of the ferromagnetic element, the triggering pole of the exciter magnet EM, and the most recently stored polarity and position of the exciter magnet in relation to the rotating shaft is available at the triggering time $T_s$ of the ferromagnetic element, i.e., simultaneously within the scope of the response times of the selected elements.

The capacitor C in the evaluation circuit is provided to store the supply energy obtained from the signal pulses at least until the signal has been evaluated and the counter value has been stored in the nonvolatile memory unit.

Instead of pulse wires or Wiegand wires, it would also be possible to use other types of ferromagnetic elements, provided that the conditions for the "instantaneous reversal" of the Weiss regions are fulfilled.

To avoid misunderstanding, it should be pointed out that, ignoring stray fields, the ferromagnetic element FE is characterized by the presence of only one magnetic input and one magnetic output. Although it is conceivable that there could any number of parallel and/or serial interruptions between the input and output, this would not represent a departure from the inventive idea of a single element.

Instead of Hall sensors, it would also be possible to use other sensors such as field plates to determine the polarity or position of the exciter magnet. It is also possible to prepare the exciter magnet in such a way that its position and/or polarity can be determined by means of a capacitive measurement instead by the Hall sensor. The use of the previously described position detector in conjunction with a precision rotational angle sensor in the form of a so-called "multiturn" is also possible, as described and illustrated in, for example, EP 0,658,745. In this case, the reference line L corresponds to the zero point of the precision rotational angle sensor being used.

When Wiegand wires, for example, are used, synchronization with a precision rotational angle sensor requires the availability of precise data on the state of magnetization of the ferromagnetic element FE. For this purpose, the arrangement with two coils according to FIG. 1, for example, is suitable. By supplying external current to one of the coils, e.g., to coil SP1, it is possible to trigger a voltage pulse in the second coil, e.g., coil SP2, as a function of the magnetization of the ferromagnetic element. This same procedure is also possible with two coils arranged one above the other. It is also possible to trigger a voltage pulse with a short current pulse or a current with a slow linear rise, in which case only a single coil SP would be required.

LIST OF REFERENCE SYMBOLS 10 shaft
14 end
15 end
16 end
17 end
22 output terminal
23 output terminal
24 output terminal
30 evaluation circuit
32 input terminal
33 input terminal
34 recognition circuit
35 recognition circuit
36 nonvolatile memory
38 counter
39 taps
40 interface
41 connecting line
42 line
α triggering angle
C capacitor
D rectifier
EM exciter magnet
EM1 exciter magnet
EM2 exciter magnet
EM3 exciter magnet
EM4 exciter magnet
FE ferromagnetic element
FL1 flux-conducting piece
FL2 flux-conducting piece
HS Hall sensor
L reference line
N north pole
R1 arrow
R2 arrow
S south pole
SP sensor coil
SP1 sensor coil
SP2 sensor coil
SE additional sensor element
$T_s$ time at which ferromagnetic element FE is triggered
Z1 exciter magnet base state
Z2 exciter magnet base state
Z3 exciter magnet base state
Z4 exciter magnet base state

The invention claimed is:

1. Detector for detecting movements, comprising:
a moveable exciter magnet (EM);
only one ferromagnetic element (FE) having Weiss regions and Bloch walls;
an induction element (SP1) surrounding said ferromagnetic element (FE);
a second induction element (SP2) surrounding said ferromagnetic element;
said induction element (SP1) provides a first output (22) at time Ts when said ferromagnetic element (FE) is triggered and remagnetized by said exciter magnet (EM);
said second induction element (SP2) provides a second output (23) substantially but not precisely simultaneously with said first output at time (Ts) when said ferromagnetic element (FE) is triggered and remagnetized by said exciter magnet (EM) without further movement of said exciter magnet (EM); and,
said first (22) and second (23) outputs are shifted in time with respect to each other, said time shift and sequence of occurrence of said first (22) and second (23) outputs determines the direction in which said remagnetization of said ferromagnetic element is triggered and the polarity and position of said exciter magnet (EM).

2. Detector according to claim 1, wherein said movable magnet is a rotatable exciter magnet (EM) and said detector is adapted for detecting rotational movements.

3. Detector according to claim 1, further comprising: an evaluation circuit (30), said evaluation circuit includes a counter (38), a capacitor, and a non volatile memory unit (36); and, said exciter magnet (EM) is rotatable and the detector is adapted for detecting rotational movements.

4. Detector according to claim 3 wherein the polarity and direction of movement of said exciter magnet (EM) at time (Ts) is determined from data in said nonvolatile memory (36) and from said first and second outputs (22, 23).

5. Detector according to claim 3 wherein the energy supply for said evaluation circuit (30) is taken from said first and second output signals used to detect position and/or polarity of said exciter magnet.

6. Detector according to claim 3 wherein said nonvolatile memory unit (36) is a FRAM and/or an EEPROM unit.

7. Detector according to claim 1 wherein said ferromagnetic element (FE) is a pulse wire.

8. Detector according to claim 1 wherein said induction element (SP1) is a coil used to measure said magnetization direction of said ferromagnetic element (FE) in conjunction with said second induction element (SP2).

9. Detector according to claim 1 wherein said second induction element (SP2) is a coil wound over said ferromagnetic element (FE) and is used to determine the direction in which the remagnetization of the ferromagnetic element (FE) is triggered.

10. Detector according to claim 1 wherein said induction element (SP1) is a coil and said second induction element (SP2) is a coil, and said induction element (SP1) and said second induction element (SP2) are used to determine the direction in which the remagnetization of the ferromagnetic element (FE) is triggered.

11. Detector according to claim 1 wherein at least one ferromagnetic flux conducting piece (FL1 and/or FL2) for guiding and/or bundling the flux resides proximate to said ferromagnetic element (FE).

12. Detector according to claim 1 wherein said induction element (SP1) can be supplied with an external current pulse, which serves either to initiate the biasing of the ferromagnetic element (FE) or to continue biasing.

13. Detector for detecting movements, comprising:
   a moveable exciter magnet (EM);
   only one ferromagnetic element (FE) having Weiss regions and Bloch walls;
   an induction element (SP) surrounding said ferromagnetic element (FE);
   a sensor element (SE) coordinated to said ferromagnetic element (FE);
   said induction element (SP) provides a first output (22) at time (Ts) when said ferromagnetic element (FE) is triggered and remagnetized by said exciter magnet (EM);
   said sensor element (SE) provides a second output (24) substantially but not precisely simultaneously with said first output at time Ts when said ferromagnetic element (FE) is triggered and remagnetized by said exciter magnet (EM) without further movement of said exciter magnet (EM); and,
   the direction in which said remagnetization of said ferromagnetic element is triggered by said exciter magnet (EM) is established by whether or not said sensor element (SE) has been excited.

14. Detector according to claim 13 wherein said movable exciter magnet is a rotatable exciter magnet (EM) and said detector is adapted for detecting rotational movements.

15. Detector according to claim 14 wherein said sensor element (SE) is a Hall sensor (HS) and wherein the polarity and direction of movement of said exciter magnet (EM) at time (Ts) is determined from data in said nonvolatile memory (36) and from said first output (22) and said second output (24), said second output generated by said Hall sensor (HS).

16. Detector according to claim 15 wherein the energy supply for said evaluation circuit (30) is taken from said first and second output signals used to detect position and/or polarity of said exciter magnet.

17. Detector according to claim 15 wherein said nonvolatile memory unit (36) is a FRAM and/or an EEPROM unit.

18. Detector according to claim 13 further comprising: an evaluation circuit (30), said evaluation circuit includes a counter (38), a capacitor, and a non volatile memory unit (36);
   and, said exciter magnet (EM) is rotatable and the detector is adapted for detecting rotational movements.

19. Detector according to claim 13 wherein said ferromagnetic element (FE) is a pulse wire.

20. Detector according to claim 13 wherein said induction element (SP) is a coil used to measure said magnetization direction of said ferromagnetic element (FE) in conjunction with said sensor element (SE).

21. Detector according to claim 13 wherein said sensor element (SE) is a Hall sensor (HS) for measuring the polarity and determining the position of the exciter magnet (EM).

22. Detector according to claim 13 wherein said exciter magnet moves in two rotational directions, and, said exciter magnet (EM) has an axis which is mounted parallel to said ferromagnetic element (FE).

23. Detector according to claim 13 wherein said exciter magnet moves in two rotational directions, and, said exciter magnet (EM) has an axis which is mounted perpendicular to said ferromagnetic element (FE).

24. Detector according to claim 13 wherein at least one ferromagnetic flux conducting piece (FL1 and/or FL2) for guiding and/or bundling the flux resides proximate to said ferromagnetic element (FE).

25. Detector according to claim 13 wherein said sensor element (SE) can be supplied with an external current pulse, which serves either to initiate the biasing of the ferromagnetic element (FE) or to continue biasing.

* * * * *